United States Patent [19]

Dapper et al.

[11] Patent Number: 5,588,022

[45] Date of Patent: Dec. 24, 1996

[54] METHOD AND APPARATUS FOR AM COMPATIBLE DIGITAL BROADCASTING

[75] Inventors: Mark J. Dapper, Cincinnati; Michael J. Geile, Loveland; Barry W. Carlin, Greenhills, all of Ohio

[73] Assignee: Xetron Corp., Cincinnati, Ohio

[21] Appl. No.: 206,368

[22] Filed: Mar. 7, 1994

[51] Int. Cl.$^6$ .......................... H04L 27/00; H04L 27/28; H04L 27/18; H04L 23/02
[52] U.S. Cl. .................... 375/216; 375/260; 375/261; 375/279; 375/298; 375/308; 375/329; 375/340
[58] Field of Search .................. 375/216, 260, 375/261, 279, 280, 281, 298, 308, 328, 331, 329, 268, 300, 316, 324, 259, 295, 340; 370/121, 18, 19; 348/471, 472, 487, 473, 437; 332/103, 149; 329/347, 304

[56] References Cited

U.S. PATENT DOCUMENTS

| | | | |
|---|---|---|---|
| 3,845,391 | 10/1974 | Crosby | 375/45 |
| 3,885,217 | 5/1975 | Cintron | 375/42 |
| 3,919,479 | 11/1975 | Moon et al. | 375/260 |
| 3,919,640 | 11/1975 | Simciak | 375/42 |
| 4,051,438 | 9/1977 | Pickett et al. | 455/105 |
| 4,385,381 | 5/1983 | Alexis | 370/69.1 |
| 4,399,558 | 8/1983 | Smollin | 455/108 |
| 4,425,642 | 1/1984 | Moses et al. | 375/48 |
| 4,571,549 | 2/1986 | Lods et al. | 375/39 |
| 4,615,040 | 9/1986 | Mojoli et al. | 375/40 |
| 4,628,517 | 12/1986 | Schwarz et al. | 375/40 |
| 4,660,192 | 4/1987 | Pomatto, Sr. | 370/11 |
| 4,665,427 | 5/1987 | Beckley et al. | 348/487 |
| 4,817,116 | 3/1989 | Akaiwa et al. | 375/49 |
| 4,881,241 | 11/1989 | Pommier et al. | 375/38 |
| 4,881,245 | 11/1989 | Walker et al. | 375/38 |
| 4,973,923 | 11/1990 | Kuisma | 455/110 |
| 5,006,926 | 4/1991 | Tsinberg | 348/437 |
| 5,128,933 | 7/1992 | Baranoff-Rossine | 370/69.1 |
| 5,134,630 | 7/1992 | Bateman | 375/43 |
| 5,134,634 | 7/1992 | Yoshida | 375/80 |
| 5,179,576 | 1/1993 | Hopkins et al. | |
| 5,274,629 | 12/1993 | Helard, et al. | 370/50 |
| 5,278,826 | 1/1994 | Murphy et al. | 370/76 |
| 5,291,289 | 3/1994 | Hulyalkar et al. | |
| 5,315,583 | 5/1994 | Murphy et al. | |
| 5,333,155 | 7/1994 | Dambacher | |
| 5,406,551 | 4/1995 | Saito et al. | |
| 5,430,492 | 7/1995 | Dambacher | |

OTHER PUBLICATIONS

Alard, M. and Lassalle, R., "Principles of Modulation and Channel Coding for Digital Broadcasting for Mobile Receivers", EBU Review, No. 224, Aug. 1987, pp. 168–190.

*Primary Examiner*—Tesfaldet Bocure
*Attorney, Agent, or Firm*—C. O. Edwards

[57] ABSTRACT

A broadcasting method for simultaneously broadcasting analog and digital signals in a standard AM broadcasting channel is provided by: broadcasting an amplitude modulated radio frequency signal having a first frequency spectrum, wherein the amplitude modulated radio frequency signal includes a first carrier modulated by an analog program signal; and simultaneously broadcasting a plurality of digitally modulated carrier signals within a bandwidth which encompasses the first frequency spectrum, each of the digitally modulated carrier signals being modulated by a portion of a digital program signal, wherein a first group of the digitally modulated carrier signals lying within the first frequency spectrum are modulated in-quadrature with the first carrier signal, and wherein second and third groups of the digitally modulated carrier signals lie outside of the first frequency spectrum and are modulated both in-phase and in-quadrature with the first carrier signal. Transmitters and receivers which operate in accordance with the above method are also provided.

25 Claims, 4 Drawing Sheets

5,588,022

METHOD AND APPARATUS FOR AM COMPATIBLE DIGITAL BROADCASTING

BACKGROUND OF THE INVENTION

This invention relates to radio broadcasting and, more particularly, to methods of and apparatus for broadcasting digitally modulated signals and analog amplitude modulated signals within the same frequency channel assignment.

There has been increasing interest in the possibility of broadcasting digitally encoded audio signals to provide improved audio fidelity. Several approaches have been suggested, including out-of-band techniques in which the digital radio signals would be broadcast in a specially designated frequency band, and in-band techniques in which the radio frequency signals would be broadcast within vacant slots between adjacent channels in the existing broadcast band (interstitial approach) or within the same frequency channel allocations currently used by commercial broadcasters (in-band on-channel approach). The in-band approach may be implemented without the need for additional frequency coordination and with relatively minor changes to existing transmitting equipment. Of course, any digital audio broadcasting (DAB) technique should not degrade reception by conventional analog receiver circuits.

In-band approaches to digital audio broadcasting have thus far only been proposed in the FM band (88 MHz to 108 MHz), since the bandwidth of AM channels is quite narrow. However, the use of digital audio broadcasting in the AM band (530 kHz to 1700 kHz) would provide AM broadcasting stations with a means to compete with high quality portable audio sources such as cassette tapes and compact disc players. It would therefore be desirable to extend the in-band on-channel (IBOC) approach to AM broadcasting frequencies to provide enhanced fidelity through digital signalling without affecting reception by existing analog AM receivers.

SUMMARY OF THE INVENTION

The broadcasting method of this invention utilizes a composite waveform comprising: an amplitude modulated radio frequency signal, wherein the amplitude modulated radio frequency signal includes a first carrier amplitude modulated by an analog signal; and a plurality of digitally modulated carrier signals within a frequency range which includes the frequency spectrum of the amplitude modulated radio frequency signal, each of the digitally modulated carrier signals being digitally modulated by a portion of a digital signal, wherein a first group of the digitally modulated carrier signals overlap the frequency spectrum of the amplitude modulated radio frequency signal and are modulated in-quadrature with the first carrier signal, and wherein second and third groups of the digitally modulated carrier signals lie outside of the frequency spectrum of the analog modulated radio frequency signal and are modulated both in-phase and in-quadrature with the first carrier signal.

The invention also encompasses a radio frequency transmitter comprising: means for transmitting a composite radio frequency signal, having an amplitude modulated signal including a first carrier amplitude modulated by an analog signal, and a plurality of digitally modulated carrier signals within a frequency range which encompasses the frequency spectrum of the amplitude modulated signal, each of the digitally modulated carrier signals being digitally modulated by a portion of a digital signal, wherein a first group of the digitally modulated carrier signals overlap the frequency spectrum of the analog modulated signal and are modulated in-quadrature with the first carrier signal, and wherein second and third groups of the digitally modulated carrier signals lie outside of the frequency spectrum of the analog modulated signal and are modulated both in-phase and in-quadrature with the first carrier signal.

Transmitters which broadcast signals in accordance with this invention use a method of modulating electrical signals comprising the steps of: providing an amplitude modulated signal in a first frequency band; providing a first plurality of orthogonal quadrature amplitude modulated carriers in the first frequency band; and providing second and third groups of quadrature amplitude modulated carriers in second and third frequency bands, with the second and third frequency bands encompassing frequencies above and below frequencies encompassed by the first frequency band, respectively.

The invention further encompasses a radio frequency receiver comprising: means for receiving both analog and digital portions of a composite radio frequency waveform, wherein the waveform includes a first signal having a first carrier amplitude modulated by an analog signal, and a plurality of digitally modulated carrier signals within a frequency range which encompasses the frequency spectrum of the amplitude modulated radio frequency signal, each of the digitally modulated carrier signals being digitally modulated by a portion of a digital signal, wherein a first group of the digitally modulated carrier signals overlap the frequency spectrum of the first signal and are modulated in-quadrature with the first carrier, and wherein second and third groups of the digitally modulated carrier signals lie outside of the frequency spectrum of the first signal and are modulated both in-phase and in-quadrature with the first carrier; means for detecting the analog signal on the first carrier; and means for detecting the digital signal on the digitally modulated carriers.

This invention provides an in-band on-channel broadcasting method by which digital representations of audio programming material, or other digital data, can be transmitted within an existing AM broadcast channel without adversely affecting existing analog AM receivers and with relatively minor modifications to existing AM transmitting equipment. Transmitters and receivers that transmit and receive signals in accordance with the broadcasting method are also encompassed by this invention.

BRIEF DESCRIPTION OF THE DRAWINGS

The invention will be more readily apparent to those skilled in the art by reference to the accompanying drawings wherein.

DESCRIPTION OF THE PREFERRED EMBODIMENT

This invention provides a method of simultaneously broadcasting both an analog amplitude modulated signal and a digital signal on the same channel assignment as the existing analog AM broadcasting allocation. When this technique is applied to AM radio broadcasts, the broadcasting can be done in the same frequency band and at the same carrier frequencies that are currently allocated for AM broadcasting. The technique of broadcasting the digital signal in the same channel as an analog AM signal is called in-band on-channel (IBOC) broadcasting. The need to prevent mutual interference places restrictions on the digital waveform that is placed beneath the analog AM spectrum. This broadcasting is accomplished by transmitting a digital waveform by way of a plurality of carriers, some of which are modulated in-quadrature with the analog AM signal and are positioned within the spectral region where the standard AM broadcasting signal has significant energy. The remaining digital carriers are modulated both in-phase and in-quadrature with the analog AM signal and are positioned in the same channel as the analog AM signal, but in spectral regions where the analog AM signal does not have significant energy. There are various methods for producing orthogonally related signals. The specific method employed to ensure this orthogonality condition is not a part of this invention. In the United States, the emissions of AM broadcasting stations are restricted in accordance with Federal Communications Commission (FCC) regulations to lie within a signal level mask defined such that: emissions 10.2 kHz to 20 kHz removed from the analog carrier must be attenuated at least 25 dB below the unmodulated analog carrier level, emissions 20 kHz to 30 kHz removed from the analog carrier must be attenuated at least 35 dB below the unmodulated analog carrier level, and emissions 30 kHz to 60 kHz removed from the analog carrier must be attenuated at least [35 dB+1 dB/kHz] below the unmodulated analog carrier level.

Figure 1:
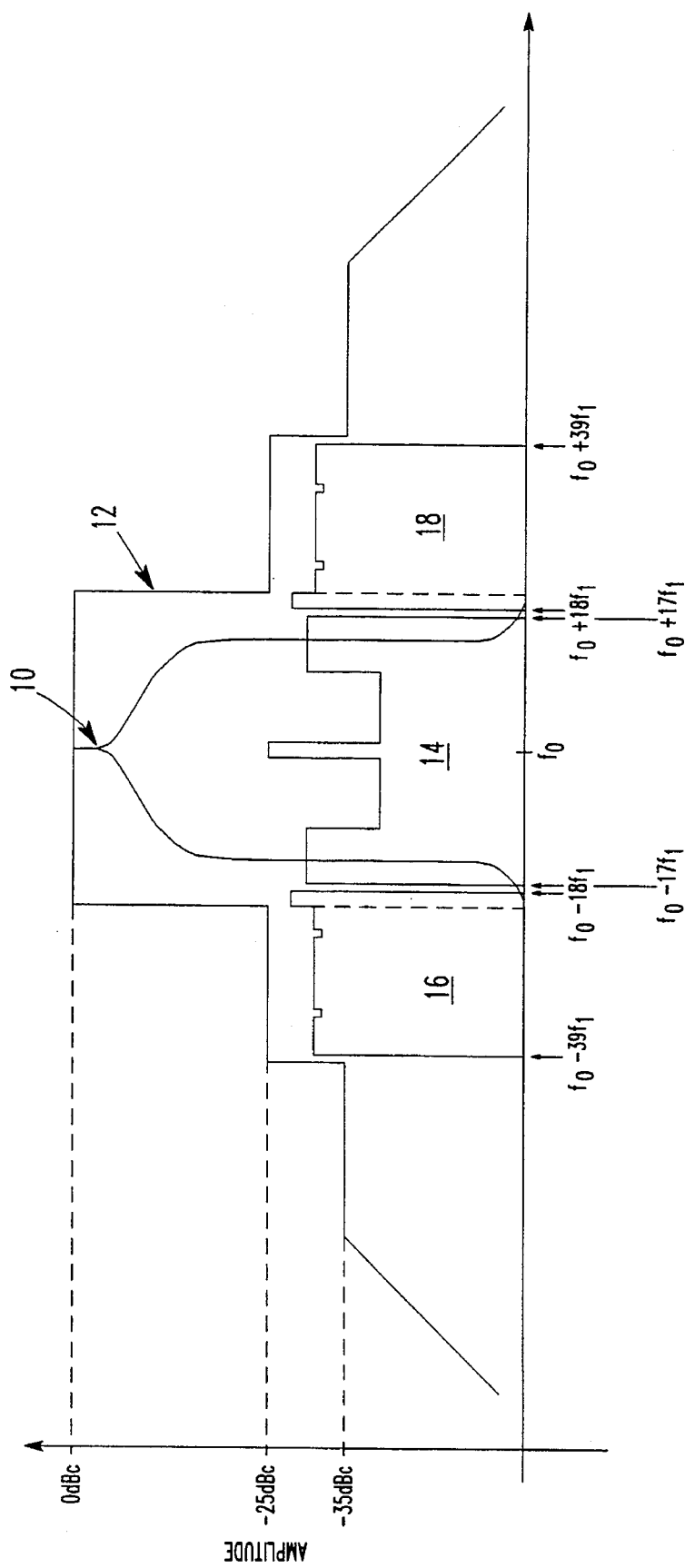
FIG. 1 is a spectral representation of a composite analog AM and digital broadcasting signal having carriers positioned in accordance with the present invention.

FIG. 1 shows the spectrum of an AM digital audio broadcasting signal having carriers positioned in accordance with the present invention. Curve 10 represents the standard broadcasting amplitude modulated carrier signal, wherein the carrier has a frequency of $f_0$. The FCC emissions mask is represented by item number 12. Recent advances in source coding, such as the German Institut Für Rundfunktechnik MUSICAM (Masking-pattern Adapted Subband Coding And Multiplexing) algorithm, have shown that enhanced audio quality for stereo program material can be achieved by broadcasting digital signals at rates as low as 96 kilobits per second (kbps). Waveforms which support this data rate can be inserted within the FCC emissions mask presently allocated for AM stations by employing bandwidth efficient modulation techniques.

The digitally modulated carriers in this invention are generated via orthogonal frequency division multiplexing (OFDM). This format enables the spectra of these carriers to be overlapped without any intervening guard bands, thereby optimizing spectral utilization. However, a guard interval can be used in the time domain to compensate for signal timing jitter. The OFDM modulation technique is extremely beneficial for successful DAB operation since bandwidth is a premium commodity in the AM band. An additional advantage is that there is no need to isolate the DAB digital carriers from each other via filtering in either the transmitter or receiver since the orthogonality condition of OFDM minimizes such interference.

The OFDM waveform is composed of a series of data carriers spaced at 500 Hz. This produces enhanced spectral containment and enables the AM DAB waveform to extend extremely close to the edge of the FCC emissions mask, yet remain compliant. An additional feature of this approach is that the amplitude of each carrier can be tailored to boost signal power in areas where high interference levels are anticipated, such as locations close to the carrier frequencies of interferers. This strategy produces an optimal allocation of signal energy and thereby maximizes the potential AM DAB coverage region.

In this invention, the composite analog and digital DAB waveform includes a plurality of modulated carriers which are fully compliant with the FCC emissions mask. In the preferred embodiment of this invention, 76 carriers, spaced $f_1$=500 Hz apart, are used to carry the digital information. A first group of thirty four of the digitally modulated carriers are positioned within a frequency band extending from $(f_0-17\ f_1)$ to $(f_0+17\ f_1)$, as illustrated by the envelope labeled 14 in FIG. 1. Most of these signals are placed 30 to 40 dB lower than the level of the unmodulated AM carrier signal in order to minimize crosstalk with the analog AM signal. Crosstalk is further reduced by encoding this digital information in a manner that guarantees orthogonality with the analog AM waveform. This type of encoding is called complementary encoding (i.e. complementary BPSK, complementary QPSK, or complementary 32 QAM) more fully described and claimed in copending application Ser. No. 08/368,061 filed Jan. 3, 1995. Complementary BPSK modulation is employed on the innermost digital carrier pair at $f_0 \pm f_1$ to facilitate timing recovery via a Costas loop. These carriers are set at a level of –25 dBc. Eighteen carriers in this first group located at $f_0-10\ f_1$ to $f_0\cdot 2\ f_1$ and $f_0+2\ f_1$ to $f_0+10\ f_1$ are modulated using complementary QPSK and have a level of –39.7 dBc. The final fourteen carriers in the first group are located at $f_0-17\ f_1$ to $f_0-11\ f_1$ and $f_0+11\ f_1$ to $f_0+17\ f_1$. These carriers are modulated using complementary 32 QAM and have a level of –30 dBC.

Additional groups of quadrature amplitude modulated digital signals are placed outside the first group. The need for these digital waveforms to be in-quadrature with the analog signal is eliminated by restricting the analog AM signal bandwidth. This is not anticipated to be an unreasonable requirement since the ceramic IF filters typically found in analog AM receivers limit the audio response to 3.5 kHz. All of the carriers in a second and a third group, encompassed by envelopes 16 and 18 respectively, are modulated using 32 QAM. The carriers located at $f_0-19\ f_1$, $f_0-18\ f_1$, $f_0+18\ f_1$, and $f_0+19\ f_1$ have a level of 28 dBC. The carriers at $f_0-39\ f_1$ to $f_0-34\ f_1$, $f_0-32\ f_1$ to $f_0-23\ f_1$, $f_0-21\ f_1$, $f_0+21\ f_1$, $f_0+23\ f_1$ to $f_0+32\ f_1$, and $f_0+34\ f_1$ to $f_0+39\ f_1$ have a level of –31 dBc. The remaining carriers at $f_0-33\ f_1$ and $f_0-22\ f_1$ and $f_0+22\ f_1$ and $f_0+33\ f_1$ have a level of –32 dBc.

The OFDM carriers are spaced at $f_1$=500 Hz. However, because a time-domain guard band is used, the symbol rate for each carrier is $f_r$=128*200 500/132 symbols per second. The pair of complementary BPSK carriers has 1 bit per symbol, resulting in a bit rate of 18 $f_r$. The nine pairs of complementary QPSK carriers each contain 2 bits per symbol, resulting in a total of 18 $f_r$ bits per second. The seven pairs of complementary 32 QAM carriers each have 5 bits per symbol, resulting in 35 $f_r$ bits per second. The 42 individual 32 QAM carriers each carry 5 bits per symbol, resulting in 210 $f_r$ bits per second. The total data rate for all OFDM carriers is 264 $f_r$, or 128 k bits per second.

The occupied bandwidth of the entire composite AM DAB signal is 40 kHz, as measured to the outermost first nulls of the digital waveform. This spectrum falls within the central 40 kHz portion of the FCC emissions mask. The OFDM sidelobes that extend beyond frequencies outside $f_0 \pm 20$ kHz, fall below the –35 dBc portion of the emissions mask without any additional filtering since the OFDM sidelobe spacing is only $f_1$=500 Hz.

There are vacant OFDM slots at ±20 $f_1$ and ±40 $f_1$. This provides additional immunity to first and second adjacent channel interference since the predominant AM signal component occurs at the carrier frequency. Likewise, the AM DAB spectrum is virtually unoccupied outside of $f_0$±20 kHz to ensure a degree of protection against second adjacent channel interferers.

Figure 2:
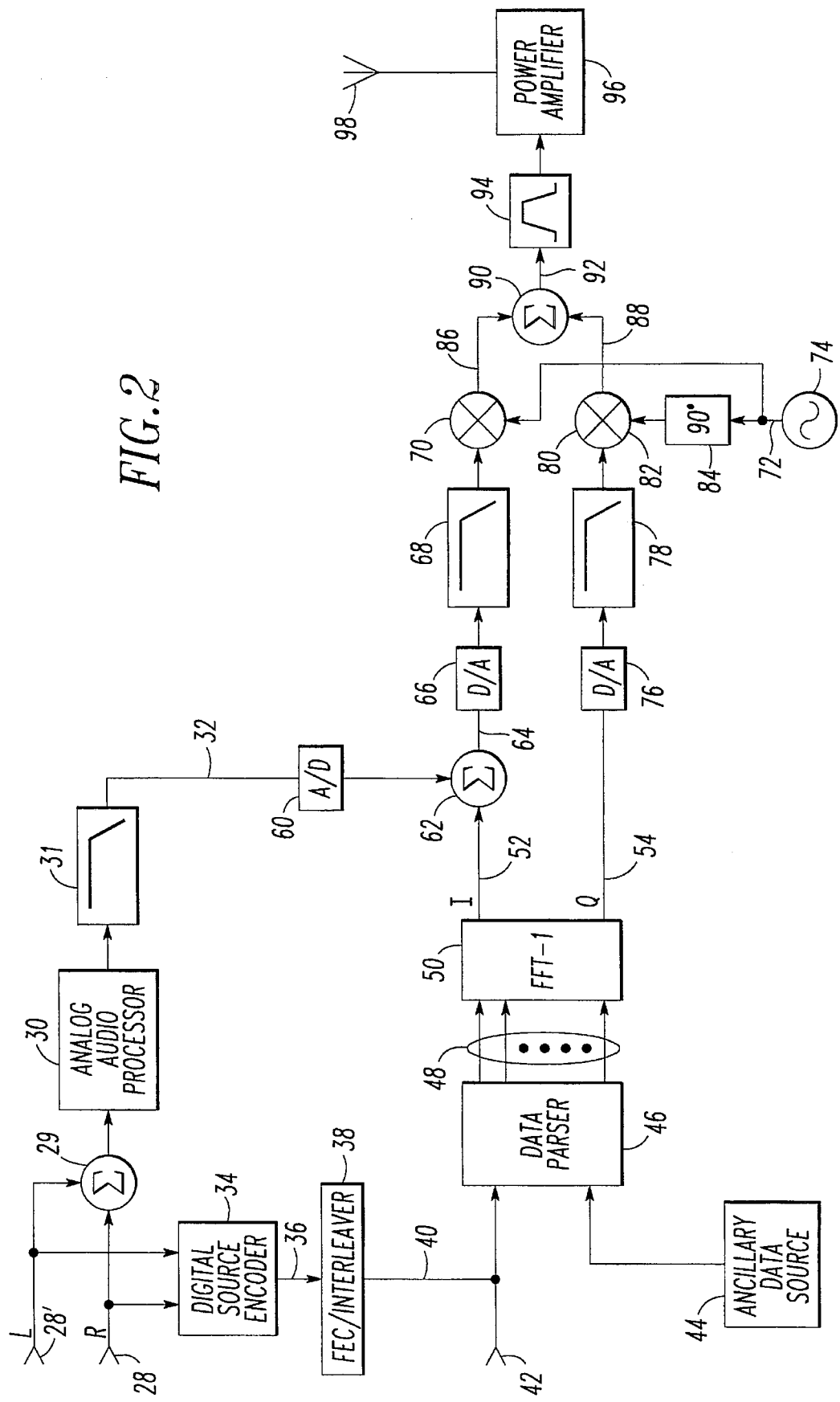
FIG. 2 is a block diagram of a transmitter constructed in accordance with this invention.

FIG. 2 is a block diagram of a transmitter constructed in accordance with this invention. An analog program signal (which in this example includes right and left stereo portions) that is to be transmitted is impressed onto input terminals 28 and 28'. The left and right channels are combined in summation point 29 and then fed through an analog audio processor 30 to increase the average analog AM modulation from 30% to 85%, which extends the coverage region considerably. Such processors are commonplace at analog AM radio stations throughout the world. That signal is passed through a low pass filter 31 having a sharp cutoff characteristic, to produce a filtered monaural analog program signal on line 32. Filter 31 may, for example, have a cutoff frequency of 6 kHz and 40 dB attenuation beyond 6.5 kHz.

For those applications in which the analog and digital portions of transmitted signal will be used to convey the same program material, a digital source encoder 34, which may conform to the ISO MPEG Layer 2A, converts the right and left analog program signals to a 96 kbps joint stereo digital signal on line 36. A forward error correction encoder and interleaver circuit 38 improves data integrity over channels corrupted with impulsive noise and interference, producing a 128 kbps digital signal on line 40. For those instances where the digital signal to be transmitted is not a digital version of the analog program signal a data port 42 is provided to receive the digital signal. An ancillary data source 44 is also provided for those instances in which the digital version of the analog program signal, or a digital signal supplied to port 42, is to be supplemented by including additional data.

Data parser 46 receives the digital data and produces a plurality of outputs on lines 48. The signals on pairs of lines 48 from the data parser 46 constitute complex coefficients that are in turn applied to an inverse Fast Fourier Transform (FFT) algorithm in block 50, which generates the baseband in-phase, I, and quadrature, Q, components of the data signal, on lines 52 and 54 respectively. The processed baseband analog AM signal is converted to a digital signal by analog-to-digital converter 60 and combined with the in-phase portion of the digital DAB waveform at summation point 62 to produce a composite signal on line 64. The composite signal on line 64 is converted to an analog signal by digital-to-analog converter 66, filtered by low pass filter 68, and passed to a mixer 70 where it is combined with a radio frequency signal produced on line 72 by a local oscillator 74. The quadrature signal on line 54 is converted to an analog signal by analog-to-digital converter 76 and filtered by low pass filter 78 to produce a filtered signal which is combined in a second mixer 80, with a signal on line 82. The signal on line 72 is phase shifted as illustrated in block 84 to produce the signal on line 82. The outputs of mixers 70 and 80 are delivered on lines 86 and 88 to a summation point 90 to produce a composite waveform on line 92. The spurious mixing products are muted by bandpass filter 94, and the resulting DAB signal is subsequently amplified by a power amplifier 96 for delivery to a transmitting antenna 98.

Figure 3:
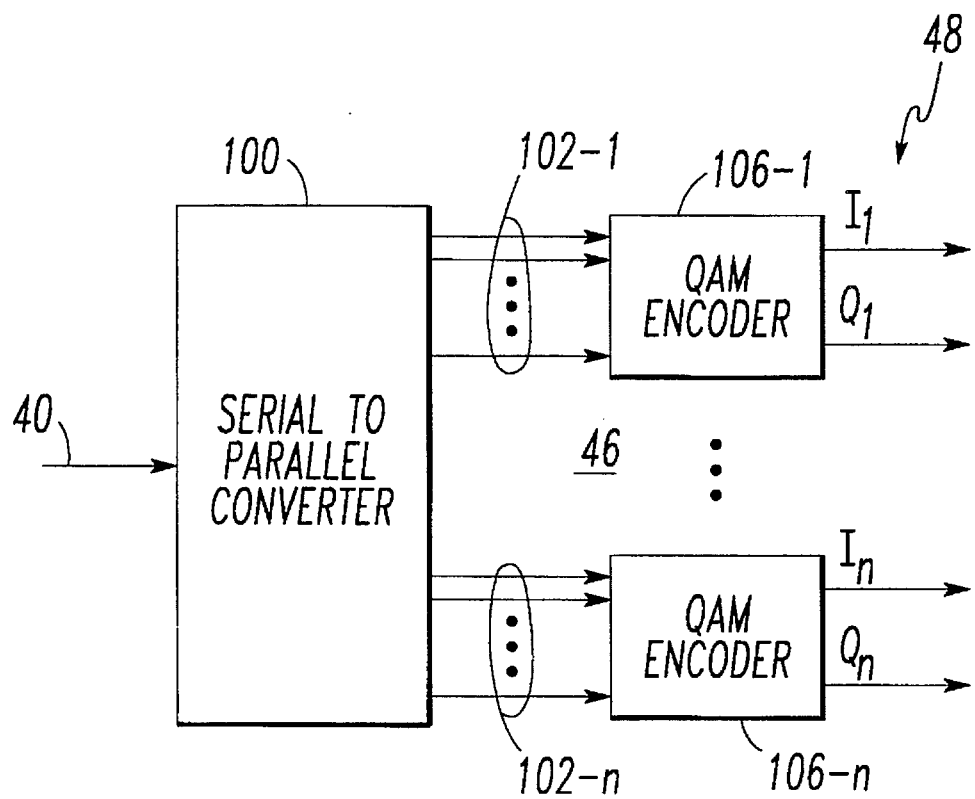
FIG. 3 is a block diagram of a data parser used in the transmitter of FIG. 2.

FIG. 3 is a block diagram of the data parser 46 of FIG. 2. The data parser includes a serial-to-parallel converter 100 which receives a serial digital signal, as illustrated by the input line 40, and produces a plurality of outputs in the form of digital signals on a plurality of groups of lines as illustrated by groups 102-1 to 102-N. Each group of lines feeds a QAM encoder, such as encoders 106-1 to 106-N to produce an in-phase output signal $I_1$–$I_N$ and a quadrature output signal $Q_1$–$Q_N$. In a practical application there may be, for example, 5 lines per group and 76 QAM encoders. In addition, some QAM encoders may use BPSK or QPSK.

Figure 4:
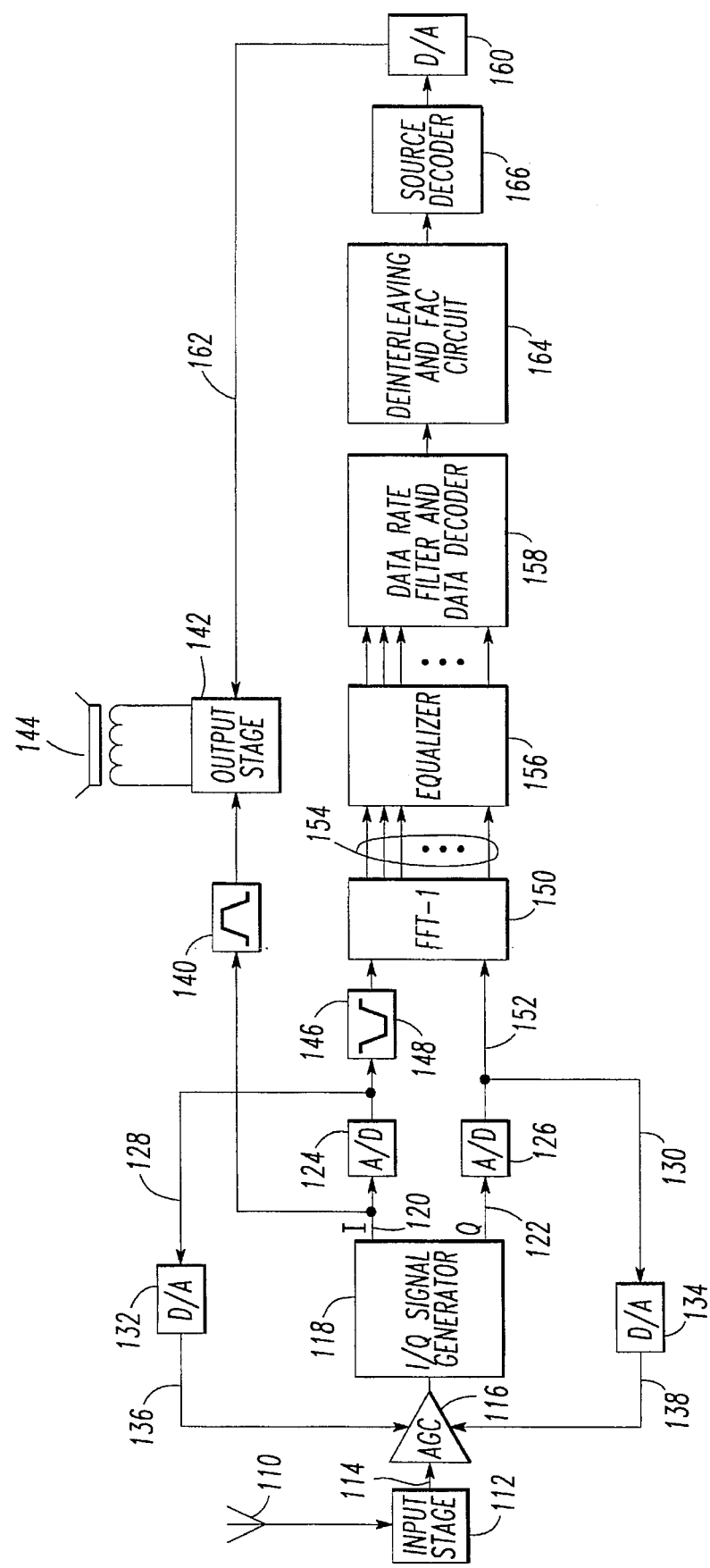
FIG. 4 is a block diagram of a receiver constructed in accordance with this invention.

FIG. 4 is a block diagram of a receiver constructed to receive digital and analog signals broadcast in accordance with this invention. An antenna 110 receives the composite waveform containing the digital and analog signals and passes the signal to conventional input stages 112, which may include a radio frequency preselector, an amplifier, a mixer and a local oscillator. An intermediate frequency signal is produced by the input stages on line 114. This intermediate frequency signal is passed through an automatic gain control circuit 116 to an I/Q signal generator 118. The I/Q signal generator produces an in-phase signal on line 120 and a quadrature signal on line 122. The in-phase channel output on line 120 is input to an analog-to-digital converter 124. Similarly, the quadrature channel output on line 122 is input to another analog-to-digital converter 126. Feedback signals on lines 128 and 130 are input to digital-to-analog converters 132 and 134, respectively. The digital-to-analog converters outputs on line 136 and 138 are used to control the automatic gain control circuit 116. The signal on line 120 includes the analog AM signal which is separated out as illustrated by block 140 and passed to an output stage 142 and subsequently to a speaker 144 or other output device.

A band reject filter 146 filters the in-phase components on line 128 to eliminate the energy of the analog AM signal and to provide a filtered signal on line 148. A fast Fourier transform circuit 150 receives the digital signals on lines 148 and 152, and produces output signals on lines 154. These output signals are passed to an equalizer 156 and to a data rate filter and data decoder 158. The output of the data decoder is sent to a deinterleaving circuit and forward error correction decoder 164 in order to improve data integrity. The output of the deinterleaver/forward error correcting circuit is passed to a source decoder 166. The output of the source decoder is converted to an analog signal by a digital-to-analog converter 160 to produce a signal on line 162 which goes to the output stage 142.

The present invention utilizes an AM DAB waveform that minimizes the magnitude of changes necessary to convert existing AM radio stations to DAB because the bandwidth is completely within the FCC emissions mask for AM transmission. Therefore, it is expected that broadcasters can retain their existing transmit antennas. Their feed networks may need to be updated, however, since group delay variation in the channel needs to be reasonably constant to minimize intersymbol interference for the digital signal, a consideration that was less critical for analog AM transmissions. It is suspected that existing analog AM transmitters can be retained, provided that the power amplifier is operated in a reasonably linear mode. The primary hardware alteration would be to replace the low level carrier input with an AM DAB exciter. This module generates both the analog and digital portions of the AM DAB modulation and the transmitter therefore functions primarily as a linear amplifier.

Although the present invention has been described in terms of an AM digital audio broadcasting system, it should be understood that the technique could be applied to any system that transmits digital signals along with analog amplitude modulated signals. Furthermore, it should be understood that the information sent by the digital signal can be different from the information sent by the analog amplitude modulated signal. Therefore the methods of this invention can be used to transmit data of various types, such as traffic or weather information, video signals or military communication signals, in combination with an amplitude modulated signal. Potential application areas include amplitude modulated military communications, and television signals in which the video information is amplitude modulated.

We claim:

1. A radio frequency broadcasting method, said method comprising the steps of:

amplitude modulating a first carrier signal by an analog signal to generate a first radio frequency signal having a first frequency spectrum, generating a plurality of digitally modulated carrier signals for broadcast, said signals being within a frequency range which encompasses the frequency spectrum of the first radio frequency signal, each of said digitally modulated carrier signals being digitally modulated by a portion of a digital signal, wherein a first group of said digitally modulated carrier signals overlap said first frequency spectrum and are modulated in-quadrature with said first carrier signal, and wherein second and third groups of said digitally modulated carrier signals lie outside of said first frequency spectrum and are modulated both in-phase and in-quadrature with said first carrier signal; and simultaneously broadcasting said first radio frequency signal and said plurality of digitally modulated carrier signals.

2. A radio frequency broadcasting method according to claim 1, wherein:

said digitally modulated carrier signals are separated in frequency by a sub-multiple of an allocated channel spacing.

3. A radio frequency broadcasting method according to claim 1, wherein:

no energy is transmitted at digitally modulated carrier signal positions located at centers of adjacent channels.

4. A radio frequency broadcasting method according to claim 1, wherein:

the digitally modulated carrier signals in said first group of said digitally modulated carrier signals have amplitudes which are less than the unmodulated first carrier signal amplitude.

5. A radio frequency broadcasting method according to claim 4, wherein:

the digitally modulated carrier signals in said second and third groups of said digitally modulated carrier signals have amplitudes which are less than the amplitude of the unmodulated first carrier signal.

6. A radio frequency broadcasting method according to claim 1, wherein:

selected ones of said digitally modulated carrier signals lying closest in frequency to the frequency of said first carrier are modulated in a complementary BPSK format.

7. A radio frequency broadcasting method according to claim 6, wherein:

said selected ones of said digitally modulated carrier signals serve as a reference level for other ones of said digital carrier signals.

8. A radio frequency broadcasting method according to claim 1, wherein said analog signal and said digital signal are different representations of the same program material.

9. A radio frequency broadcasting method according to claim 1, wherein said second and third groups of said digitally modulated carrier signals are modulated in a 32-QAM constellation.

10. A radio frequency broadcasting method according to claim 1, wherein said digitally modulated carrier signals lie within a second frequency spectrum occupying a bandwidth of 40 kHz.

11. A radio frequency broadcasting method according to claim 1, wherein said digitally modulated carrier signals are equally spaced in frequency.

12. A radio frequency broadcasting method according to claim 11, wherein said digitally modulated carrier signals are spaced in frequency by a sub-multiple of an allocated channel spacing.

13. A method of modulating electrical signals, said method comprising the steps of:

providing an amplitude modulated signal in a first frequency band;

providing a first plurality of orthogonal quadrature amplitude modulated carriers in said first frequency band; and providing second and third groups of quadrature amplitude modulated carriers in second and third frequency bands, said second and third frequency bands encompassing frequencies above and below frequencies encompassed by said first frequency band, respectively.

14. A method of modulating electrical signals according to claim 13, wherein:

said orthogonal quadrature modulated carriers have amplitudes which are less than the unmodulated amplitude of said amplitude modulated signal.

15. A method of modulating electrical signals according to claim 13, wherein:

said second and third groups of said quadrature amplitude modulated carriers have amplitudes which are less than the unmodulated amplitude of said amplitude modulated signal.

16. A signal transmission method, said method comprising the steps of:

amplitude modulating a first carrier signal by an analog signal to generate a first signal having a first frequency spectrum;

generating a plurality of digitally modulated carrier signals for transmission, said signals being within a frequency range which encompasses the frequency spectrum of the first signal, each of said digitally modulated carrier signals being digitally modulated by a portion of a digital signal, wherein a first group of said digitally modulated carrier signals overlap said first frequency spectrum and are modulated in-quadrature with said first carrier signal, and wherein second and third groups of said digitally modulated carrier signals lie outside of said first frequency spectrum and are modulated both in-phase and in-quadrature with said first carrier signal; and simultaneously transmitting said first signal and said plurality of digitally modulated carrier signals.

17. A signal transmission method according to claim 16, wherein:

said carrier signals in said first group of said digitally modulated carrier signals have amplitudes which are less than the unmodulated first carrier signal amplitude.

18. A signal transmission method according to claim 17, wherein:

said carrier signals in said second and third groups of said digitally modulated carrier signals have amplitudes which are less than the amplitude of the unmodulated first carrier signal.

19. A signal transmission method according to claim 16, wherein said analog signal and said digital signal are different representations of the same information.

20. A signal transmission method according to claim 16, wherein said second and third groups of carrier signals are modulated in a 32-QAM constellation.

21. A signal transmission method according to claim 16, wherein said digitally modulated carrier signals are equally spaced in frequency.

22. A radio frequency transmitter comprising:

means for amplitude modulating a first carrier signal by an analog signal to generate a first radio frequency signal having a frequency spectrum; means for generating a plurality of digitally modulated carrier signals within a frequency range which encompasses the frequency spectrum of the first radio frequency signal, each of said digitally modulated carrier signals being digitally modulated by a portion of a digital signal, wherein a first group of said digitally modulated carrier signals overlap the frequency spectrum of the first radio frequency signal and are modulated in-quadrature with said first carrier signal, and wherein second and third groups of said digitally modulated carrier signals lie outside of the frequency spectrum of said first signal and are modulated both in-phase and in-quadrature with said first carrier signal; and means for simultaneously transmitting said first radio frequency signal and said plurality of digitally modulated carrier signals.

23. A radio frequency receiver comprising:

means for receiving both analog and digital portions of a composite radio frequency waveform, wherein the waveform includes a first signal having a first carrier amplitude modulated by an analog signal, and a plurality of digitally modulated carrier signals within a frequency range which encompasses the frequency spectrum of the first signal, each of said digitally modulated carrier signals being amplitude modulated by a portion of a digital signal, wherein a first group of said digitally modulated carrier signals overlapping the frequency spectrum of the first signal are modulated in-quadrature with said first carrier signal, and wherein second and third groups of said digitally modulated carrier signals lie outside of the frequency spectrum of the first signal and are modulated both in-phase and in-quadrature with said first carrier signal;

means for detecting said analog signal on said first amplitude modulated carrier; and means for detecting said digital signal on said digitally modulated carriers.

24. A radio frequency receiver according to claim 23, wherein said means for detecting said digital signal uses the phase of said first carrier signal as a phase reference to demodulate said digitally modulated carriers.

25. A radio frequency receiver according to claim 23, further comprising:

a filter for extracting said analog signal from an in-phase channel of said means for detecting said analog signal.

* * * * *